US005377450A

United States Patent [19]

Varajon

[11] Patent Number: 5,377,450

[45] Date of Patent: Jan. 3, 1995

[54] ADJUSTABLE DOOR HANDLE ASSEMBLY

[75] Inventor: Joseph Varajon, Romeo, Mich.

[73] Assignee: General Motors Corporation, Detroit, Mich.

[21] Appl. No.: 173,103

[22] Filed: Dec. 27, 1993

[51] Int. Cl.[6] .......... B60J 5/04; E05B 1/00

[52] U.S. Cl. .......... 49/502; 49/503; 49/460; 292/336.3; 292/353; 296/146.7

[58] Field of Search .......... 49/502, 503, 460; 292/336.3, 353; 296/146.7

[56] References Cited

U.S. PATENT DOCUMENTS

| | | | |
|---|---|---|---|
| 4,923,542 | 5/1990 | Janicki et al. | 49/502 X |
| 4,949,508 | 8/1990 | Elton | 49/502 |
| 5,226,259 | 7/1993 | Yamagata | 49/502 |
| 5,263,750 | 11/1993 | Smith et al. | 292/336.3 |
| 5,308,129 | 5/1994 | Hlavaty | 49/502 X |

FOREIGN PATENT DOCUMENTS

| | | | |
|---|---|---|---|
| 1352985 | 5/1974 | United Kingdom | F16B 21/02 |

*Primary Examiner*—Philip C. Kannan
*Attorney, Agent, or Firm*—Charles E. Leahy

[57] ABSTRACT

A door handle assembly includes a mounting bracket is mounted on the door inner panel and pivotally mounts a lever which is operable to release the door latch. A trim panel is carried by the door in spaced apart relation from the door inner panel and has an opening registering with the lever. A trim bezel is installed in the opening and has a peripheral flange adapted to overlie the trim panel around the opening. A plurality of adjusting ratcheting fasteners are installed between the trim bezel and the door inner panel to enable secure attachment of the bezel to the door inner panel and gap free engagement of the peripheral flange of the bezel with the trim panel irrespective of dimensional variation between the door inner panel and the trim panel. A door handle is mounted on the lever by a ratchet adjusting connection so that the door handle is mounted on the lever at an adjusted position irrespective of the dimensional variation.

3 Claims, 3 Drawing Sheets

ADJUSTABLE DOOR HANDLE ASSEMBLY

The invention relates to an inside door handle assembly for a vehicle door and more particularly provides adjustable mounting of the door handle assembly onto the door inner panel to accommodate the variation in the dimensional variation in the spacing between the door inner panel and the door trim panel.

BACKGROUND OF THE INVENTION

It is well known in motor vehicles to provide a vehicle door having a door inner panel and a door outer panel which are welded together and define a cavity therebetween for receiving the window lift mechanism. The door is latched to the vehicle by a door latch mounted on the door. An inside door handle assembly is mounted on the door inner panel and includes a handle which is operated to unlatch the door latch.

The door inner panel is concealed from view of the occupant by a trim panel which is mounted thereon in spaced apart relation therefrom. Because of normal variations in manufacturing processes, it is known that the dimensional spacing between the door inner panel and the trim panel will vary between vehicles.

The door handle is accessible to the occupant through an opening provided in the trim panel. The door handle assembly includes a trim bezel which overlies the trim panel around the opening and closes out the opening around the handle to maintain an aesthetically pleasing design.

The door handle assembly and the trim bezel need to be mounted on the door inner panel for structural strength, while at the same time the bezel must tightly overlie the trim panel to prevent any unsightly caps between the bezel and trim panel.

Thus, it would be desirable to provide a new and improved door handle assembly which would accommodate variations in the dimension between the door inner panel and the trim panel.

SUMMARY OF THE INVENTION

According to the invention, a mounting bracket is mounted on the door inner panel and pivotally mounts a lever which is operable to release the door latch. A trim panel is carried by the door in spaced apart relation from the door inner panel and has an opening registering with the lever. A trim bezel is installed in the opening and has a peripheral flange adapted to overlie the trim panel around the opening. A plurality of adjusting ratcheting fasteners are installed between the trim bezel and the door inner panel to enable secure attachment of the bezel to the door inner panel and gap free engagement of the peripheral flange of the bezel with the trim panel irrespective of dimensional variation between the door inner panel and the trim panel. A door handle is mounted on the lever by a ratchet adjusting connection so that the door handle is mounted on the lever at an adjusted position irrespective of the dimensional variation.

DESCRIPTION OF THE PREFERRED EMBODIMENT

Figure 1:
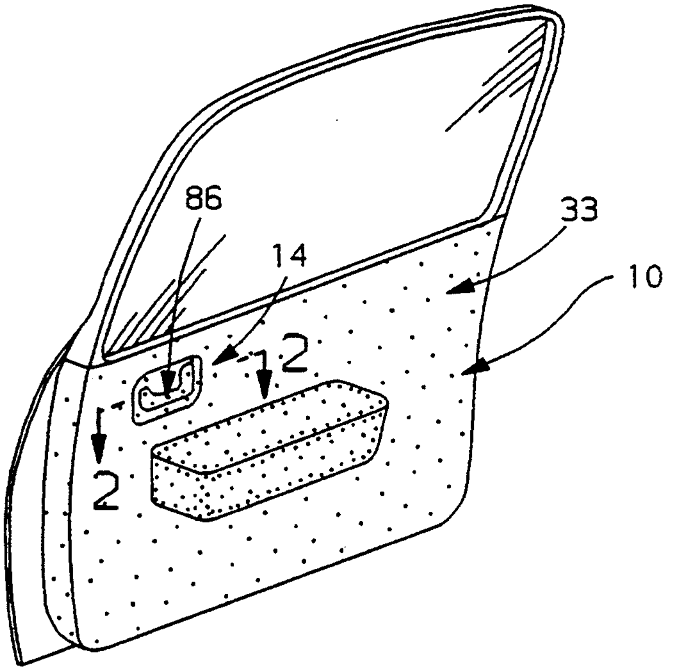
FIG. 1 a perspective view of a vehicle door.
Figure 2:
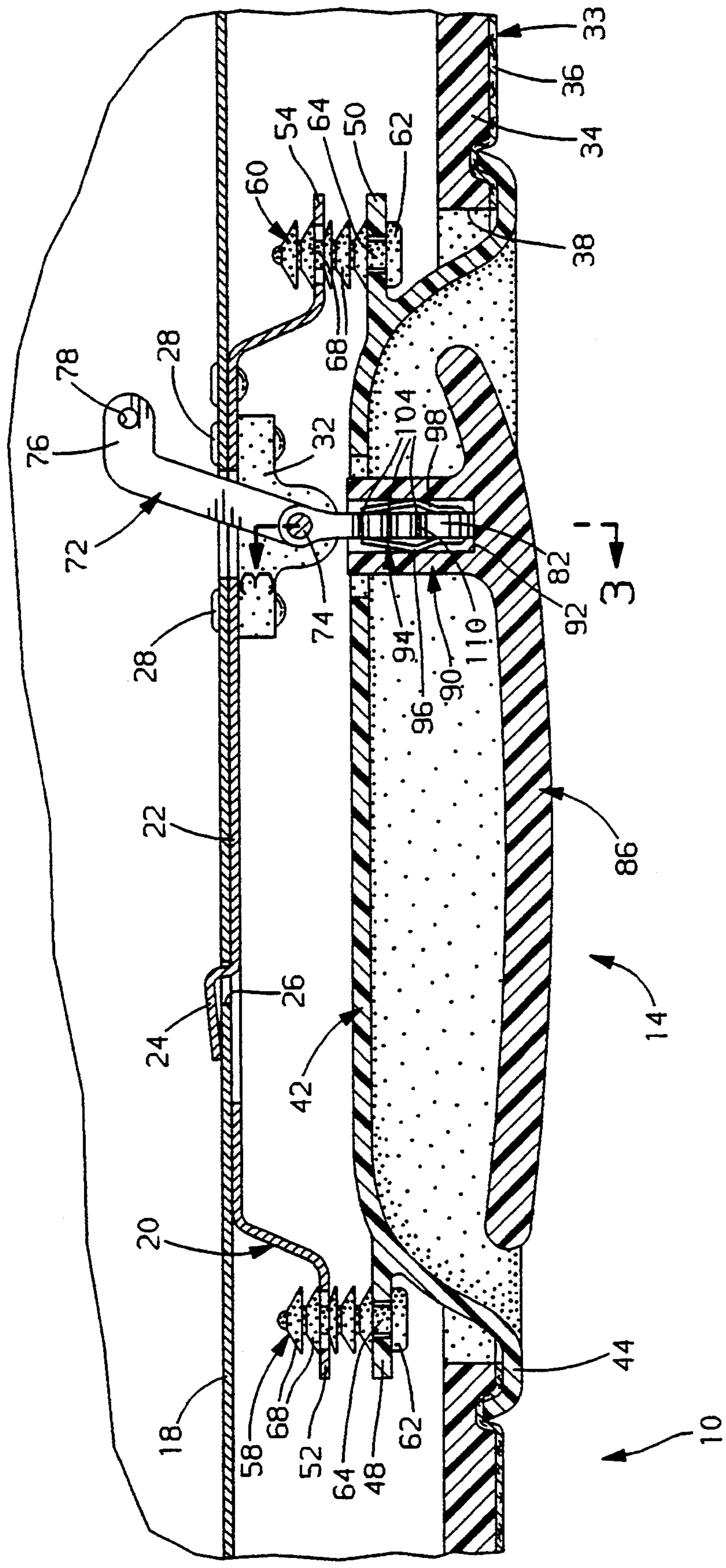
FIG. 2 is a sectional view taken in the direction of arrows 2—2 of FIG. 1.

FIGS. 1 and 2 show a vehicle door 10 having an inside door handle assembly generally indicated at 14 for operating a door latch, not shown. As seen in FIG. 2, the door 10 includes a door inner panel 18 of stamped sheet metal construction which is suitably welded to the door outer panel, not shown.

A stamped metal mounting bracket 20 includes a base 22 which abuts against the door inner panel 18 and a tang 24 which extends through an aperture 26 of the door inner panel 18 to locate the mounting bracket 20 on the panel. The mounting bracket 20 is securely attached to the door inner panel 18 by rivets 28 which extend through aligned apertures in a pair of trunion blocks 30, 32, and then through aligned apertures in the mounting bracket 20 and the door inner panel 18.

The vehicle door 10 also includes an inner trim panel 33 which is conventionally constructed of molded plastic substrate 34 covered by a trim material 36. The trim panel 33 has an opening 38 for receiving the door handle assembly 14. The door handle assembly includes a dish shaped trim bezel 42 having a peripheral flange 44 extending outwardly therefrom to overlie the trim panel 33 around the opening 38. As seen in FIG. 2, the bezel 42 has apertured mounting ears 48, 50 which register with apertured mounting ears 52, 54 of the mounting bracket 20.

A pair of yieldable plastic ratchet fasteners 58, 60 are press fit respectively into the mounting ears 48, 50 of the bezel. The ratchet fasteners 58, 60 are of injection molded construction and include a head 62, a shank 64 which is press fit into the apertured ears 48, 50, and a plurality of flexible resilient flexible fins 68 which are progressively pushed through the aperture of the apertured mounting ears 52, 54 to anchor the trim bezel 42 with respect to the mounting bracket 20.

As seen in FIG. 2, it will be understood that the trim bezel 42 may be pushed progressively outboard in the direction of the door inner panel 18 as the fins 68 of ratchet fasteners 58, 60 progressively pass through the apertured ears 52, 54. The peripheral flange 44 of the trim bezel 42 will come into engagement with the trim panel 33 thereby stopping the bezel 42 against further travel. The ratchet fasteners 58, 60 function to retain the trim bezel 42 at its position of FIG. 2 in which the peripheral flanges 44 tightly engage against the trim panel 33.

Figure 3:
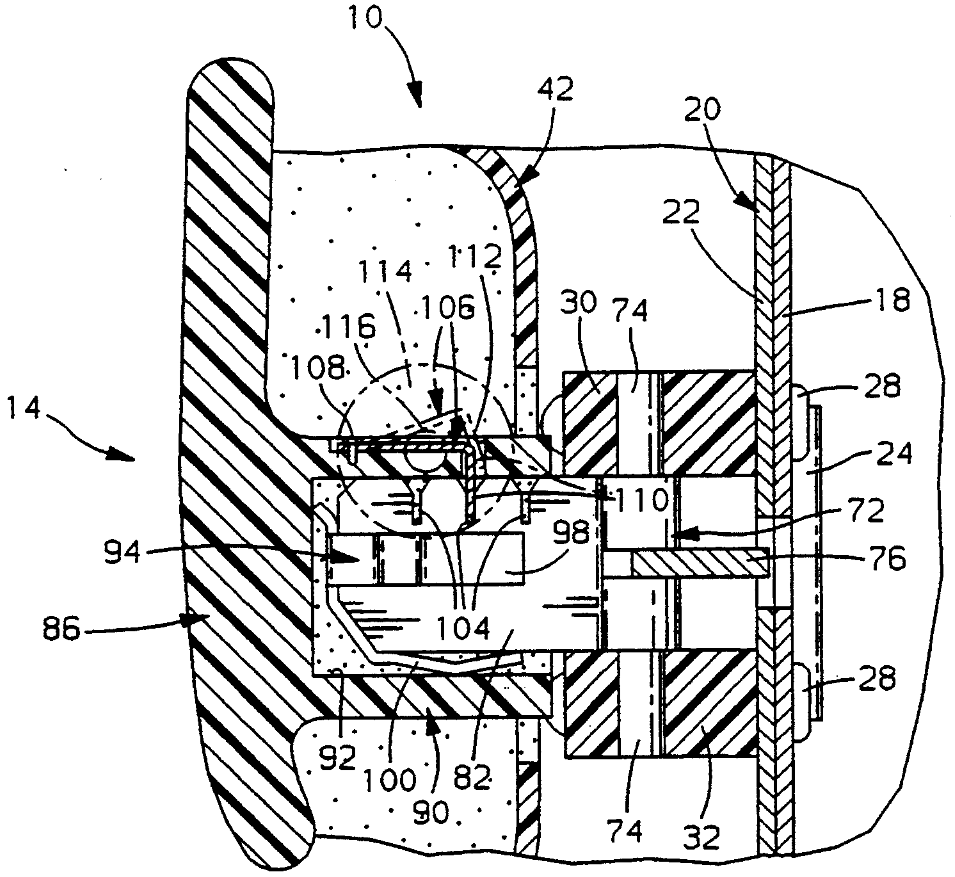
FIG. 3 is a section view taken in the direction of arrows 3—3 of FIG. 2.
Figure 4:
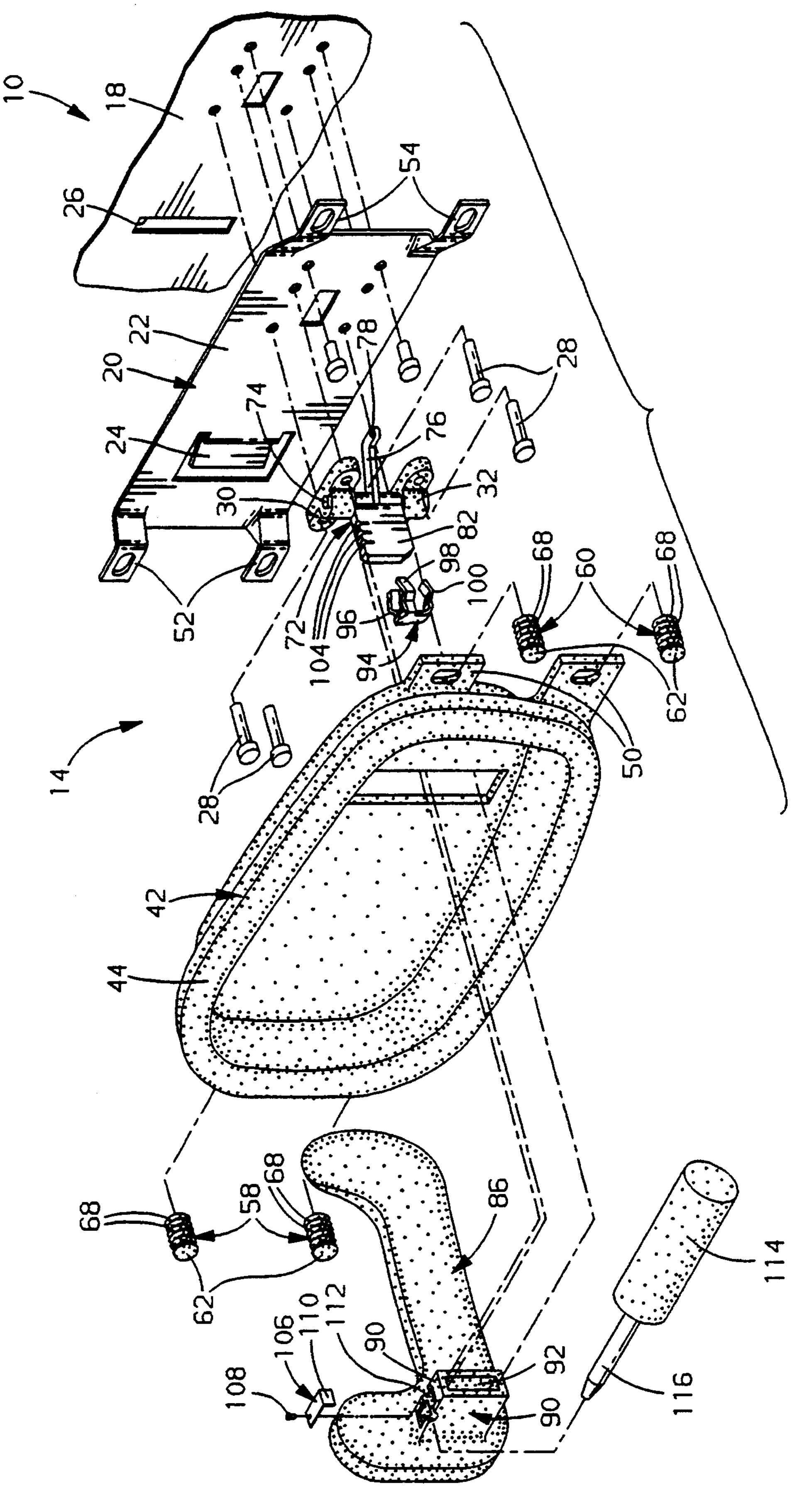
FIG. 4 is an exploded view of door handle assembly.

The door handle assembly also includes a lever 72 which is pivotally mounted on the trunion blocks 30, 32 by a pivot pin 74. The outer end 76 of the lever has a hole 78 for receiving a rod, not shown, which extends to the door latch. The inner end 82 of the lever 72 is attached to a door handle 86 as best shown in FIGS. 2, 3 and 4. The lever extends through a hole in the inner panel and a hole in the trim bezel.

The handle 86 includes a receptacle 90 having a bore 92 which is pushed onto the inner leg 82 of lever 72. A spring 94 has legs 96, 98 and 100 which grip the inner end 82 of the lever 72 to provide a resilient friction fit between a handle 86 and the lever 72. The lever 72 has a plurality of recesses 104 in the upper edge thereof. A spring clip 106 is attached to the projection 90 by a screw 108 and has a leg 110 which reaches through a slot 112 in the projection 90 to seat within one of the teeth 104. A tool 114 has a pin 116 which may be positioned as shown in FIG. 3 to retain the spring clip 106 in an elevated position to permit the lever 86 to be adjusted in and out on the lever 72. Then, when the lever reaches the proper chosen position, the tool 114 is withdrawn and the leg 110 seats in the appropriate tooth 104 to connect the handle 86 onto the lever Thus, it is seen that the invention provides a door handle assembly which can be conveniently adjusted relative to the door inner panel to properly fit irrespective of dimensional variation between the locations of the trim panel and the door inner panel.

The plastic ratcheting fastener 58 is one example of a suitable fastener. Any fastener capable of blind installation and capable of progressive push-in installation can be used to accomplish the desired adjustability.

The embodiments of the invention in which an exclusive property or privilege is claimed is defined as follows:

1. A door hingedly mounted on a vehicle and carrying a latch for latching the door in a closed position, said door comprising:
   - a door inner panel;
   - a lever pivotally mounted on the door inner panel and operable to release the door latch;
   - a trim panel carried by the door in spaced relation from the door inner panel, and having an opening therein registering with the lever;
   - a trim bezel installed in the opening and having a peripheral flange adapted to overlie the trim panel around the opening;
   - and a plurality of adjustable ratcheting fasteners acting between the trim bezel and the door inner panel to enable secure attachment of the bezel to the door inner panel and the concomitant gap free engagement of the bezel peripheral flange with the door trim panel irrespective of dimensional variation in the spacing between the door inner panel and the trim panel.

2. A door hingedly mounted on a vehicle and carrying a latch for latching the door in a closed position, said door comprising:
   - a door inner panel;
   - a lever pivotally mounted on the door inner panel and operable to release the door latch;

- a trim panel carried by the door in spaced relation from the door inner panel, and having an opening therein registering with the lever;
   - a trim bezel installed in the opening and having a peripheral flange portion adapted to overlie the trim panel around the opening;
   - a plurality of adjusting ratcheting fasteners acting between the trim bezel and the door inner panel to enable secure attachment of the bezel to the door inner panel and the concomitant gap free engagement of the bezel peripheral flange with the door trim panel irrespective of dimensional variation in the spacing between the door inner panel and the trim panel,
   - and a door handle mounted on the lever by a adjusting connecting means so that the door handle is mounted on the lever at an adjusted position irrespective of dimensional variation in the spacing between the door inner panel and the trim panel.

3. A door hingedly mounted on a vehicle and carrying a latch for latching the door in a closed position, said door comprising:
   - a door inner panel;
   - a mounting bracket mounted on the door inner panel;
   - a lever pivotally mounted on the mounting bracket and operable to release the door latch;
   - a trim panel carried by the door in spaced relation from the door inner panel, and having an opening therein registering with the lever;
   - a trim bezel installed in the opening and having a peripheral flange portion adapted to overlie the trim panel around the opening;
   - a plurality of adjusting ratcheting fasteners acting between the trim bezel and the mounting bracket to enable secure attachment of the bezel to the door inner panel and the concomitant gap free engagement of the bezel peripheral flange with the door trim panel irrespective of dimensional variation in the spacing between the door inner panel and the trim panel,
   - and a door handle mounted on the lever by a ratchet adjusting connecting means so that the door handle is mounted on the lever at an adjusted position irrespective of dimensional variation in the spacing between the door inner panel and the trim panel.

* * * * *